(12) United States Patent
Goettker (10) Patent No.: US 7,007,967 B2
(45) Date of Patent: Mar. 7, 2006

(54) SECTIONAL TONGUE ASSEMBLY FOR A TRAILER

(76) Inventor: Bernhardt P. Goettker, 14195 Ridge Canyon Rd., Valley Center, CA (US) 92082

( * ) Notice: Subject to any disclaimer, the term of this patent is extended or adjusted under 35 U.S.C. 154(b) by 138 days.

(21) Appl. No.: 10/452,991

(22) Filed: Jun. 2, 2003

(65) Prior Publication Data

US 2004/0239073 A1    Dec. 2, 2004

(51) Int. Cl.
    *B60D 1/155*    (2006.01)
(52) U.S. Cl. .................. 280/491.3; 280/479.2
(58) Field of Classification Search .......... 280/479.2, 280/479.3, 456.1, 491.1, 491.3, 491.4; 403/65, 403/92, 93, 95, 80, 119
    See application file for complete search history.

(56) References Cited

U.S. PATENT DOCUMENTS

| 4,131,378 | A | * | 12/1978 | Daws | ........................... 403/93 |
| 4,398,742 | A | * | 8/1983 | Sanders | ................... 280/491.3 |
| 4,978,134 | A | * | 12/1990 | Dahl et al. | ............... 280/491.4 |
| 5,000,473 | A | * | 3/1991 | Johnson | ................... 280/491.1 |
| D320,777 | S | | 10/1991 | Goettker | ................... D12/162 |
| 5,346,243 | A | * | 9/1994 | Boeck | ..................... 280/478.1 |
| 5,503,423 | A | * | 4/1996 | Roberts et al. | .......... 280/491.3 |
| 5,992,871 | A | | 11/1999 | Rowland et al. | ......... 280/491.3 |

* cited by examiner

*Primary Examiner*—Lesley D. Morris
*Assistant Examiner*—L. Lum
(74) *Attorney, Agent, or Firm*—Rodney F. Brown (57) ABSTRACT

A trailer tongue assembly has a base section which is engagable with a trailer and an extension section which supports a coupler. The trailer tongue assembly also has an internal hinge positioned between the extension section and the base section. The internal hinge rotationally connects the base section and the extension section and selectively provides the trailer tongue assembly with an extended operational position and a folded storage position. The internal hinge is housed in the trailer tongue assembly and is essentially shielded from view by the trailer tongue assembly when the trailer tongue assembly is in the extended operational position. The trailer tongue assembly also has a greater length in the extended operational position than in the folded storage position.

18 Claims, 8 Drawing Sheets

SECTIONAL TONGUE ASSEMBLY FOR A TRAILER

TECHNICAL FIELD

The present invention relates generally to light-weight utility trailers, such as boat trailers, and more particularly to a tongue assembly for a utility trailer.

BACKGROUND OF THE INVENTION

Light-weight utility trailers, such as boat trailers and the like, have a number of components positioned at the front of the trailer, which enable the cooperative function of the trailer and an associated tow vehicle. A tongue assembly and a coupler are commonly included among such components. The trailer may also (although not necessarily) include an actuator. The tongue assembly has a rear section, which is mounted to a front section of the trailer, and a front section, which extends away from the trailer. The coupler is mounted to the front section of the tongue assembly. If included, the optional actuator is also mounted to the tongue assembly.

The actuator is designed to actuate the brakes of the trailer in response to braking commands from the tow vehicle. The coupler is designed to couple with a hitch mounted on a rear section of the motorized tow vehicle, such as an automobile, sport utility vehicle, light truck, or the like. The hitch is typically a ball-shaped male member and the coupler is typically a bowl-shaped female member, which is configured to releasably receive the hitch. The coupler and hitch cooperatively enable a user to selectively engage the tow vehicle with the trailer for the purpose of towing the trailer and its contents to a desired location. The coupler and hitch also cooperatively enable a user to selectively disengage the tow vehicle from the trailer for the purpose of using the tow vehicle for motorized transport independent of the trailer, while storing the trailer and its contents at a desired location.

Figure 1:
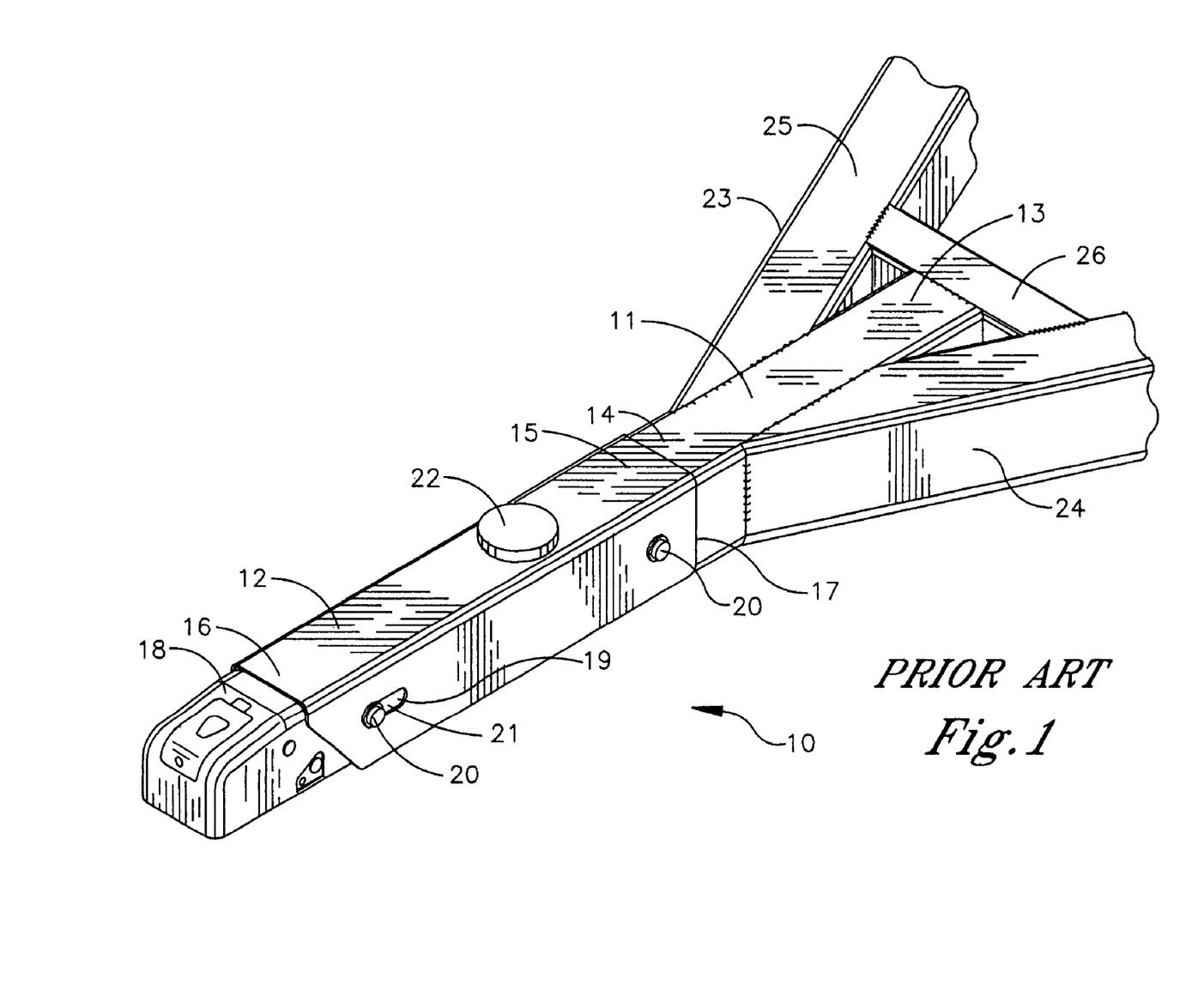
FIG. 1 is a perspective view of a prior art tongue assembly.

Referring to FIG. 1, an exemplary conventional prior art tongue assembly for a trailer is shown and generally designated 10. The prior art tongue assembly 10 has a sectional construction with a rear section 11 and a front section 12. The rear section 11 has a rear end 13 and a front end 14. The front section 12 similarly has a rear end 15 and a front end 16. The terms "front" and "rear" are used herein to describe the relative position of components of a trailer, wherein "rear" is closer to the main body of the trailer and farther from a tow vehicle associated with the trailer. "Front" is farther from the main body of the trailer and closer to the tow vehicle. The terms "top" and "bottom" are used herein to describe the relative position of components of a trailer with respect to the ground surface supporting the trailer and the associated tow vehicle, wherein "bottom" is closer to the ground surface and "top" is farther from the ground surface.

The rear and front sections 11, 12 of the tongue assembly 10 have a four-sided tubular construction, which encloses an open interior and defines a square or rectangular cross section. The rear and front sections 11, 12 are permanently joined together end-to-end at a fixed joint 17 by welding or other such fixing means so that the front end 14 of the rear section 11 is integral with the rear end 15 of the front section 12. Accordingly, the tongue assembly 10 is functionally a single unitary member having a fixed rigid character.

A coupler 18 and an optional actuator 19 are also shown in FIG. 1, which are associated with the tongue assembly 10. The coupler 18 extends from the front end 16 of the front section 12 of the tongue assembly 10 so that the coupler 18 is accessible to a hitch mounted on a tow vehicle (not shown). The coupler 18 is fixably attached or connected to the front section 12 by welding, bolting or other such conventional means so that the front section 12 supports the coupler 18. The optional actuator 19 is positioned behind the coupler 18, housed within the front section 12 of the tongue assembly 10. The actuator 19 is fixably attached to the front section 12 by actuator fasteners 20, which extend from the exterior into the interior of the front section 12 via front section apertures 21. An access port 22 is also provided in the front section 12 to enable the user to access the actuator 19. The configuration of a representative prior art front section, coupler and actuator is shown in U.S. Pat. No. Des. 320,777 to Goettker, incorporated herein by reference.

The rear section 11 of the tongue assembly 10 is mounted to a front section of the trailer 23. The front section of the trailer 23 has an "A" configuration with a first diagonal support 24, a second diagonal support 25, and a crossbar 26. The crossbar 26 extends between the first and second diagonal supports 24, 25 and is fixably attached thereto. The first and second diagonal supports 24, 25 converge and engage opposite lateral sides of the rear section 11 forward of the rear end 13. The rear end 13 extends rearward to engage the crossbar, 26. The first and second diagonal supports 24, 25 are permanently joined to the opposite lateral sides of the rear section 11 by welding or other such fixing means and the rear end 13 is similarly permanently joined to the crossbar 26.

It is common for the tongue assembly 10 to extend a substantial extension length from the front section of the trailer 23. The extension length is defined by the sum of the lengths of the front section 12 of the tongue assembly 10 and the exposed coupler 18. An exemplary extension length is typically on the order of about 1 to 3 feet.

The extension length provides adequate clearance between the rear of the associated tow vehicle and the front section of the trailer 23 and/or the contents of the trailer, which may extend beyond the front section of the trailer 23, such as the bow of a boat being carried by the trailer. Although the extension length is relatively small compared to the entire length of the trailer, the extension length is often the difference by which the trailer fits or does not fit into a size-restricted storage location, such as a garage. Accordingly, it is advantageous for a trailer to have a tongue assembly which is selectively displacable so that the trailer can be stored in tight fitting locations.

U.S. Pat. No. 5,992,871 to Rowland et al. discloses a sectional tongue assembly for a boat trailer, which has an external hinge selectively rotatably connecting the rear and front sections of the tongue assembly. When the tongue assembly of Rowland et al. is in the operational position, the trailer is at its full length with the tongue and associated coupler extended in front of the trailer. A positioning pin is also maintained in the hinge when the tongue assembly of Rowland et al. is in the operational position. The positioning pin effectively locks the hinge, thereby preventing rotational displacement of the front section of the tongue assembly relative to the trailer and the rear section of tongue assembly. When it is desired to transition the tongue assembly from the operational position to the storage position, the positioning pin is initially withdrawn from the hinge and the front section of the tongue assembly and associated coupler are pivoted about the hinge until the front section is in overlapping alignment with the trailer and the rear section of tongue assembly. When the tongue assembly of Rowland et al. is in the storage position, the trailer has a reduced length which corresponds to the overall length of the trailer minus the combined length of the front section of the tongue assembly and the exposed coupler.

It is apparent that the tongue assembly of Rowland et al. desirably reduces the length of the trailer for storage, while maintaining the trailer at full length for operation. Nevertheless, the structure of the hinge of the tongue assembly of Rowland et al. is not entirely satisfactory. In particular, the hinge is disadvantageously external to the tongue assembly. Accordingly, operation of the external hinge is subject to interference from environmental factors such as precipitation, corrosion, and dirt. Operation of the external hinge is also subject to interference from structures which may inadvertently come into contact with the hinge during use. In addition, fabrication of the external hinge requires substantial modifications to the external structure of a conventional tongue assembly. Accordingly, the external hinge of Rowland et al. is not readily adaptable to after-market or retrofit applications. Furthermore, from an appearance standpoint, the external hinge of Rowland et al. adds considerable bulk to the profile of the tongue assembly in comparison to the sleek profile of the prior art hinge-free tongue assembly, which has broad consumer acceptance.

The present invention recognizes a need for an improved hinge for a tongue assembly, which overcomes the above-recited drawbacks of the prior art hinge of Rowland et al. Therefore, it is generally an object of the present invention to provide a tongue assembly, which effectively enables a user to reduce the length of the trailer for storage, while maintaining the trailer at full length for operation. More particularly, it is an object of the present invention to provide such a tongue assembly, which employs an internal hinge to effectively enable a user to reduce the length of the trailer for storage, while maintaining the trailer at full length for operation. Still more particularly, it is an object of the present invention to provide such a tongue assembly. having an internal hinge, which reduces the susceptibility of the hinge to interference from environmental factors during operation. It is another object of the present invention to provide such a tongue assembly having an internal hinge, which reduces the susceptibility of the hinge to interference from structures which may inadvertently come into contact with the hinge during use. It is still another object of the present invention to provide such a tongue assembly having an internal hinge, which is readily adaptable to after-market or retrofit applications. It is yet another object of the present invention to provide such a tongue assembly having an internal hinge, which resembles a hinge-free tongue assembly in appearance.

These objects and others are accomplished in accordance with the invention described hereafter.

SUMMARY OF THE INVENTION

The present invention is a sectional tongue assembly for a trailer comprising a base section engagable with a trailer and an extension section capable of supporting a coupler and, if provided, an actuator. The tongue assembly further comprises an internal hinge positioned between the extension section and the base section, which rotationally connects the base section and the extension section. The tongue assembly has an extended operational position and a folded storage position. The internal hinge is housed in the tongue assembly and is essentially shielded from view by the tongue assembly when the tongue assembly is in the extended operational position. The tongue assembly also has a greater length in the extended operational position than in the folded storage position to facilitate compact storage of a trailer associated with the tongue assembly when the trailer is not in use.

The internal hinge preferably includes a base box mounted in the base section, an extension box mounted in the extension section, a pivot box positioned between the base box and the extension box, and a first pivot post and a second pivot post defining two axes of rotation. The first pivot post rotationally connects the pivot box and the base box and the second pivot post rotationally connects the pivot box and the extension box. The base box and the extension box are preferably horizontally positioned in series to define a junction between the base box and the extension box. The tongue assembly preferably further comprises a plate mounted in the base section, extending over or under the junction, and slidably engaging the base box and the extension box when the tongue assembly is in the extended operational position. The plate diverts vertical loads on the tongue assembly from the junction to the plate when the tongue assembly is in the extended operational position. The tongue assembly also preferably further comprises a stationary pin mounted through the base section. The stationary pin selectively engages the base box when the tongue assembly is in the folded storage position and selectively engages the extension box when the tongue assembly is in the extended operational position. The plate diverts horizontal loads to the stationary pin when the tongue assembly from is in the extended operational position.

The present invention is alternately characterized as a tongue assembly comprising a base section, an extension section and an internal hinge positioned between the extension section and the base section. The internal hinge includes a base box mounted in the base section, an extension box mounted in the extension section and a pivot box positioned between the base box and the extension box and rotationally connected to the base box and the extension box. The base box has a U-shaped configuration with a top face, a bottom face, a rear face, and an open front end. The extension box also has a U-shaped configuration with a top face, a bottom face, a front face and an open rear end. The open front end of the base box faces the open rear end of the extension box. The pivot box has a top crossbar and a bottom crossbar positioned below the top crossbar. The top and bottom crossbars are positioned between the top and bottom faces of the base box and the top and bottom crossbars are positioned between the top and bottom faces of the extension box. The internal hinge further includes a first pivot post and a second pivot post. The first pivot post extends between the top and bottom faces of the base box through the top and bottom crossbars and is rotationally connected to the top and bottom faces of the base box. The second pivot post extends between the top and bottom faces of the extension box through the top and bottom crossbars and is rotationally connected to the top and bottom faces of the extension box. The first pivot post and the second pivot post define two axes of rotation. The base box and the pivot box are rotationally displacable relative to each other about the first pivot post. The extension box and the pivot box are rotationally displacable relative to each other about the second pivot post.

The present invention will be further understood from the drawings and the following detailed description.

DESCRIPTION OF PREFERRED EMBODIMENTS

Figure 2:
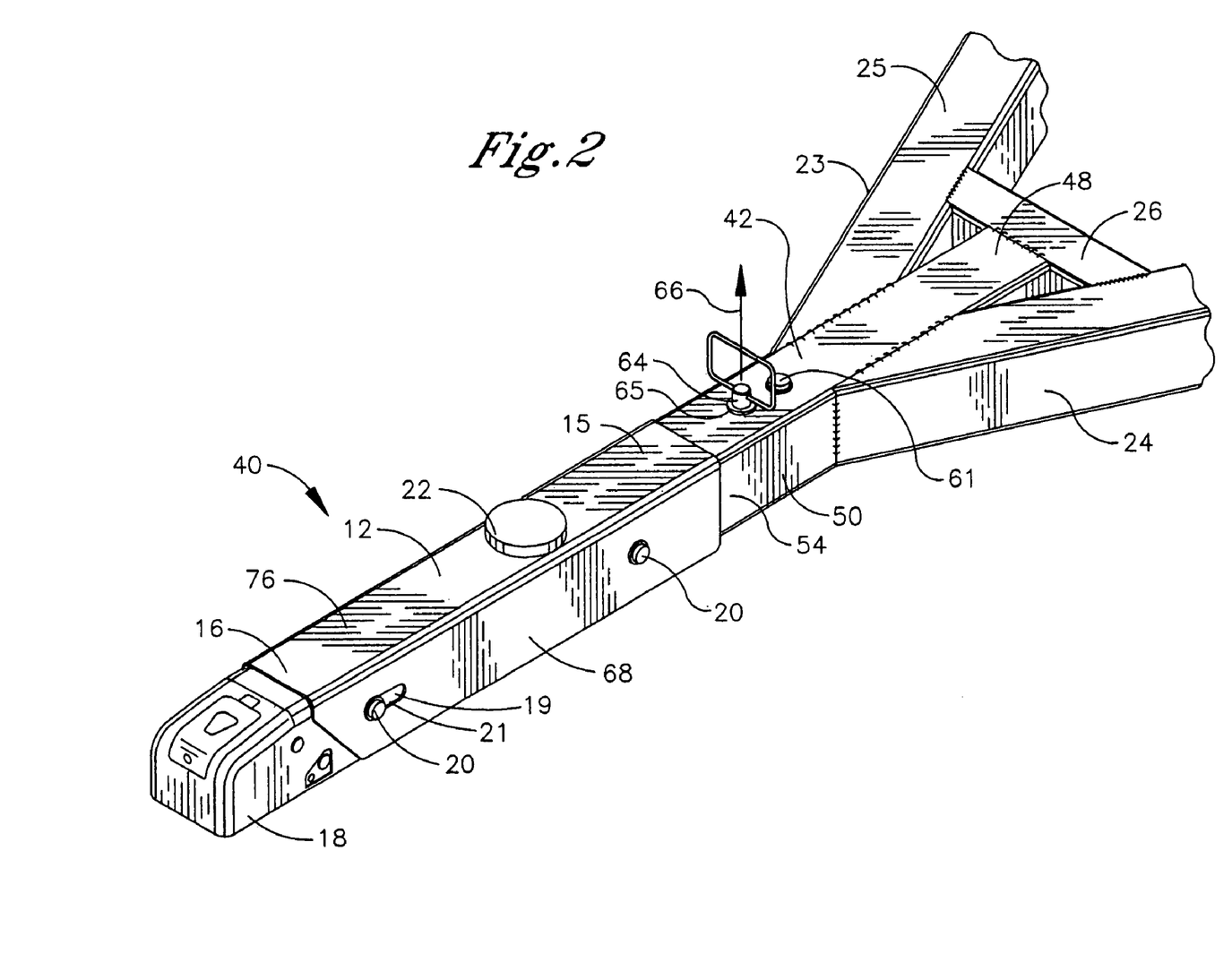
FIG. 2 is a perspective view of a tongue assembly of the present invention which is configured in an extended operational position.
Figure 3:
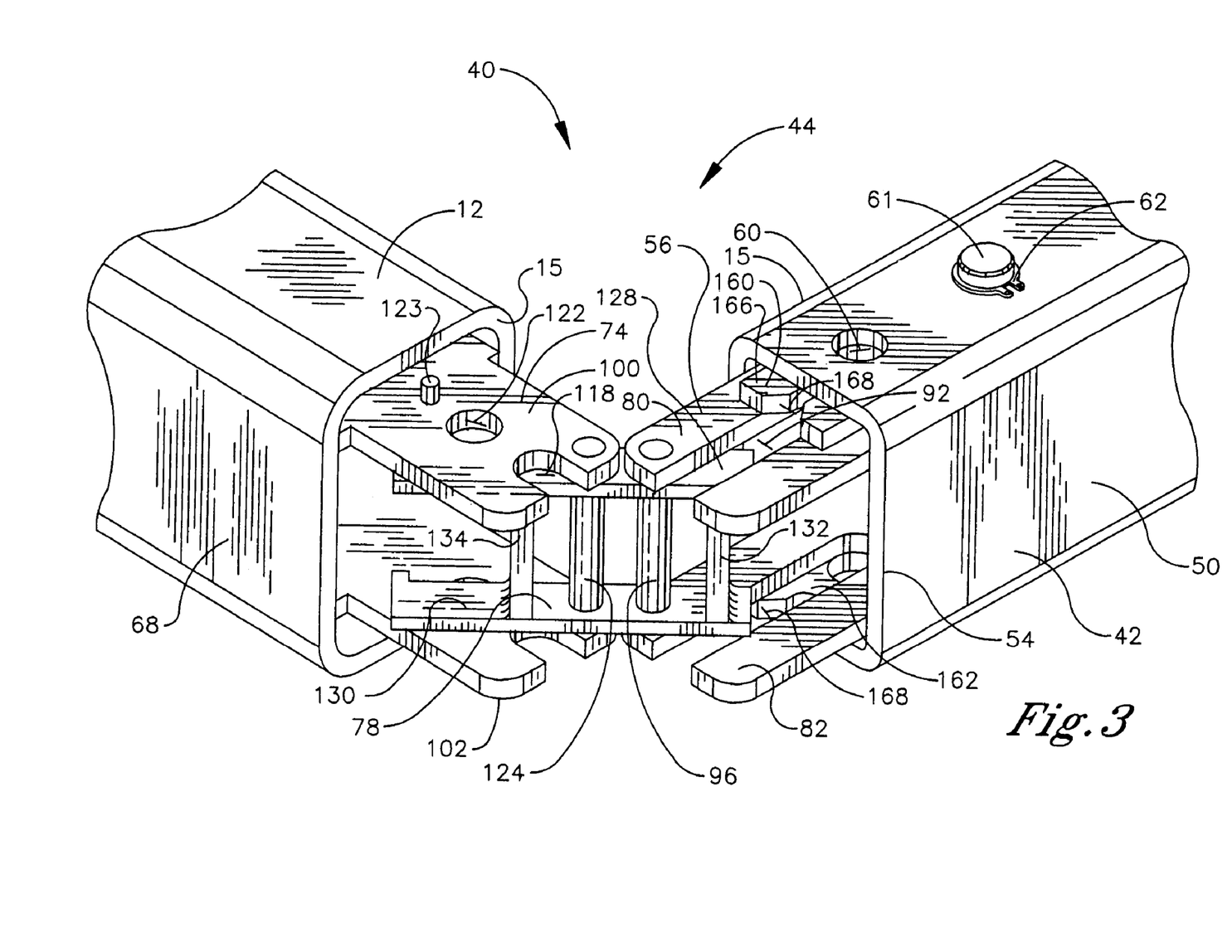
FIG. 3 is a close-up perspective view of the internal hinge of the tongue assembly of FIG. 2 as the tongue assembly is transitioning between the extended operational position and a folded storage position.

Referring to FIGS. 2 and 3, an embodiment of a tongue assembly of the present invention is shown and generally designated 40. Components of the tongue assembly 40 shown in FIGS. 2 and 3 which are common to the prior art tongue assembly 10 shown in FIG. 1 are designated by the same reference characters. FIG. 2 depicts the tongue assembly 40 in an extended operational position, while FIG. 3 shows the tongue assembly 40 in close-up as it is being transitioned between the extended operational position and an alternate position, termed the folded storage position. The tongue assembly 40 is selectively transitionable between the extended operational position and the folded storage position, in a manner described, below with reference to FIGS. 5–7.

The tongue assembly 40 generally comprises a rear section 42, an internal hinge 44 (shown in FIG. 3), and a front section 12. The rear section 42 is alternately termed the base section hereafter and the front section 12 is alternately termed the extension section hereafter. A coupler 18 and an actuator 19 are also provided in association with the extension section 12. It is understood that the actuator 19 is optional and may be omitted from the present embodiment without substantially modifying the practice of the invention. The construction of the coupler 18, actuator 19, and extension section 12 as well as their relation to one another are essentially the same as described above with reference to the tongue assembly 10 of FIG. 1. The relation of the base section 42 to the front section of the trailer 23 is likewise essentially the same as described above with reference to the rear section 11 of the tongue assembly 10 and the front section of the trailer 23, wherein the base section 42 is mounted to the front section of the trailer 23 in essentially the same manner as described above. As such, the front section of the trailer 23 and base section 42 are integral with one another.

Figure 4A:
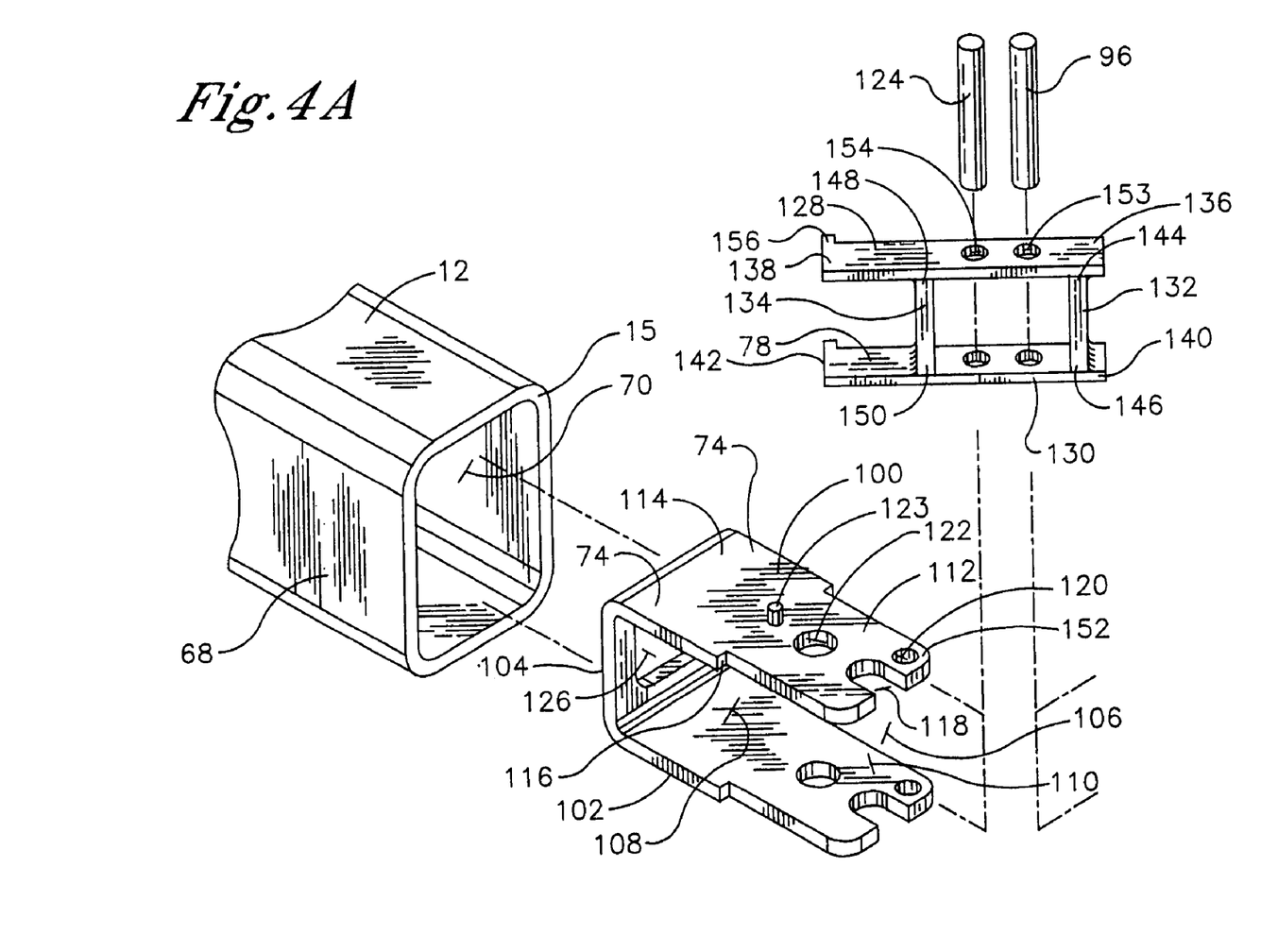
FIGS. 4A and 4B are an exploded perspective view of the internal hinge of FIG. 3.
Figure 4B:
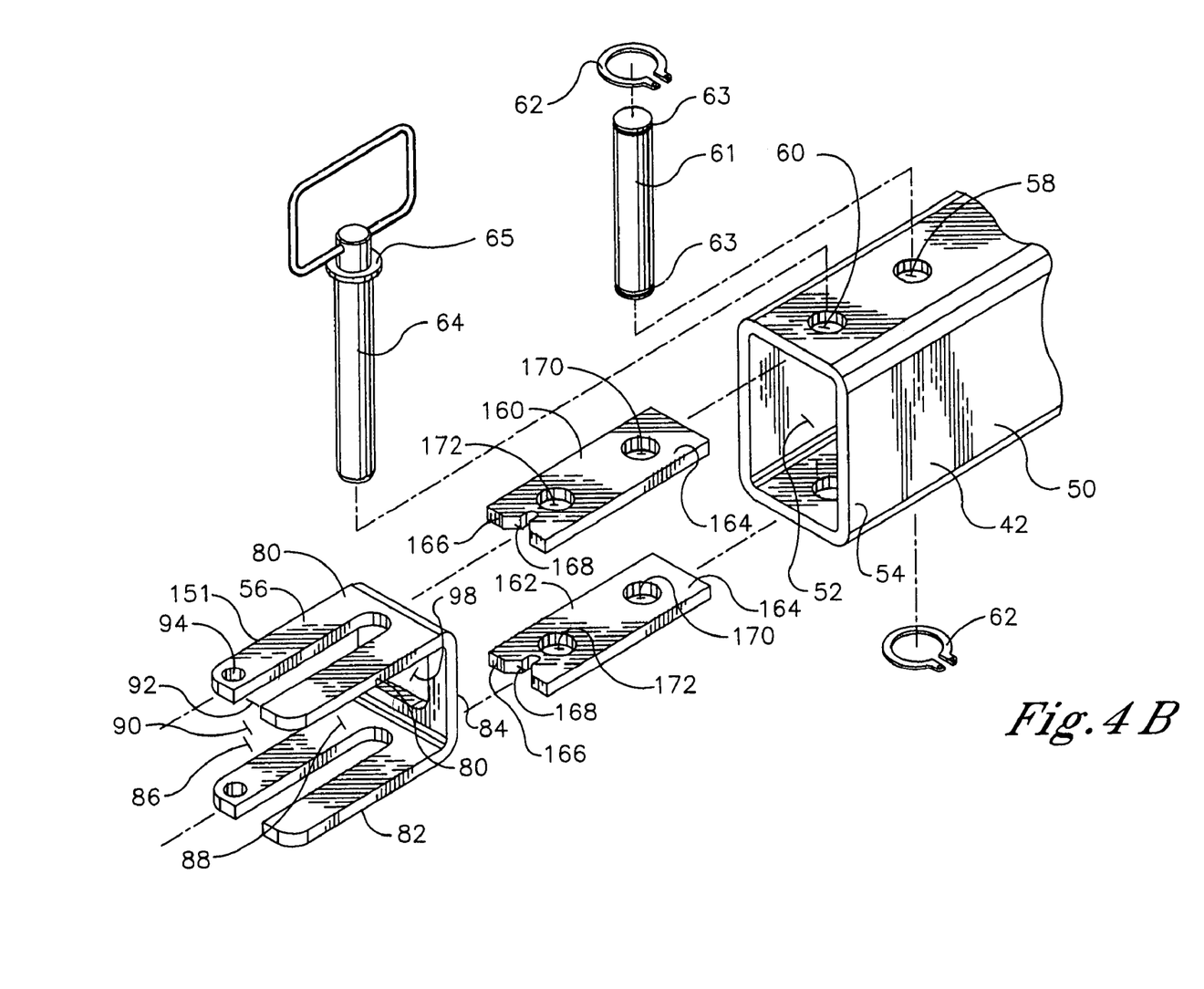

Referring to FIGS. 4A and 4B in addition to FIGS. 2 and 3, the base section 42 has a tubular configuration with walls 50 formed from a rigid high-strength material such as steel or the like. The walls 50 enclose an open interior 52, with the walls 50 and interior 52, in combination, defining a rectangular cross section. The base section 42 has an open front end 54 which opens the interior 52 of the base section 42 to the surrounding environment. The internal hinge 44 has a base box 56 which engages the front end 54 of the base section 42 and extends backward into the interior 52 of the base section 42. The base box 56 is slidably mounted in the interior 52 of the base section 42 proximal to the front end 54. The base section 42 has a stationary pin aperture 58 and a removable pin aperture 60, which are spaced from rear to front a horizontal distance apart from one another. Both the stationary pin aperture 58 and the removable pin aperture 60 extend through the top and bottom walls 50 of the base section 42. A stationary pin 61 is received by the stationary pin aperture 58 and is fixably retained therein by means of retention rings 62 spring-fitted into retention grooves 63 formed in the stationary pin 61. A removable pin 64 is received by the removable pin aperture 60 and is selectively removably retained therein by gravity and the widened head 65 of the removable pin 64 when the tongue assembly 40 is in the extended operational position shown in FIG. 2. The removable pin 64 is withdrawn from the removable pin aperture 60 in the direction of a pin removal arrow 66 when the tongue assembly 40 transitions to the folded storage position shown in FIG. 3. The stationary pin 61 and the removable pin 64 function in cooperation with the internal hinge 44 in a manner described below.

The present invention is not limited by the relative lengths of the base section 42 and extension section 12. Nevertheless, the extension section 12 often preferably has a length greater than the length of the base section 42. For example, the length of the extension section 12 may be on the order of about 18 to 36 inches. The extension section 12 has a tubular configuration similar to the base section 42. Specifically, the extension section 12 has walls 68 formed from the same or similar rigid high-strength material as the base section 42 and having essentially the same thickness as the walls 50 of the base section 42. The walls 68 enclose an open interior 70, with the walls 68 and interior 70, in combination, defining a rectangular cross section having a height and width slightly larger than those of the rectangular cross section of the base section 42. The extension section 12 has an open rear end 15 which opens the interior 70 of the extension section 12 to the surrounding environment. The rear end 15 of the extension section 12 circumscribes and preferably abuts (or alternatively overlaps) the front end 54 of the base section 42 when the tongue assembly 40 is in the extended operational position shown in FIG. 2.

Although not shown, it is alternatively within the scope of the present invention to essentially identically size the rectangular cross sections of the base and extension sections 42, 12. In accordance with this embodiment, the rear end 15 of the extension section 12 circumscribes and abuts (but does not alternatively overlap) the front end 54 of the base section 42 when the tongue assembly 40 is in the extended operational position. It is still further alternatively within the scope of the present invention to size the rectangular cross section of the base section 42 larger than that of the extension section 12. In accordance with this embodiment, the front end 54 of the base section 42 circumscribes and preferably abuts (or alternatively overlaps) the rear end 15 of the extension section 12 when the tongue assembly 40 is in the extended operational position.

The internal hinge 44 has an extension box 74 which engages the rear end 15 of the extension section 12 and extends forward into the interior 70 of the extension section 12. The extension box 74 is fixably mounted in the interior 70 of the extension section 12 proximal to the rear end 15 by means such as welding or the like. A forward portion 76 of the extension section 12, i.e., the remainder of the extension section 12 forward of the extension box 74, houses the optional actuator 19 and supports the coupler 18. As such, the extension section 12 is constructed in the same or similar manner as the prior art rear section 12. In particular, the extension section 12 has actuator fasteners 20, which extend from the exterior into the interior 70 of the extension section 12 via the extension section apertures 21. The access port 22 permits access to the interior 70 of the extension section 12 and the actuator 19 housed therein. The coupler 18 extends forward from the interior 70 of the forward portion 76 through the open front end 16 out into the surrounding environment.

In addition to the base box 56 and extension box 74, the internal hinge 44 further comprises a pivot box 78, which rotatably connects the base box 56 and the extension box 74. Further details of the internal hinge 44 are described as follows with continuing reference to FIGS. 3, 4A and 4B. The internal hinge 44 is formed from a rigid high-strength material, such as steel, having essentially the same or similar thickness as the walls 50, 68 of the base and extension sections 42,12, respectively. The base box 56 has a U-shaped configuration with a top face 80, a bottom face 82, and a rear face 84. The base box 56 also has a front 86, a first side 88 and an opposite second side 90, all of which are open. The top and bottom faces 80, 82 are positioned a vertical distance apart from one another and are essentially parallel to one another. The rear face 84 extends the distance between the top and bottom faces 80, 82 to fixably connect them. The height of the base box 56, i.e., the height of the rear face 84, which corresponds to the distance between the top and bottom faces 80, 82, is less than the height of the interior 52 of the base section 42. The widths of the top, bottom and rear faces 80, 82, 84 are essentially equal to, and preferably somewhat less than, the width of the interior 52 of the base section 42, thereby enabling the base box 56 to fit through the front end 54 into the interior 52 of the base section 42.

The top and bottom faces 80, 82 of the base box 56 are essentially identically configured. A stationary pin travel slot 92 and a rear pivot post aperture 94 formed in each of the top and bottom faces 80, 82. The stationary pin travel slot 92 is centrally aligned with the longitudinal axis of the top and bottom faces 80, 82 and is closed at the rear, but open at the front. The stationary pin travel slot 92 is slightly wider and substantially longer than the diameter of the stationary pin 61 to enable the base box 56 to slide back and forth relative to the stationary pin 61 within the limits of the stationary pin travel slot 92. The rear pivot post aperture 94 is positioned to one side of the stationary pin travel slot 92 and has a diameter slightly larger than the diameter of a rear pivot post 96 (described below with reference to the pivot box 78) to receive the rear pivot post 96 therein. A service opening 98 is provided through the rear face 84 of the base box 56, which permits service lines, such as electrical wiring or hydraulic brake lines, to pass freely through the length of the base box 56.

The extension box 74 similarly has a U-shaped configuration with a top face 100, a bottom face 102, and a front face 104. The extension box 74 also has a rear 106, a first side 108 and an opposite second side 110, all of which are open. The top and bottom faces 100, 102 are spaced a vertical distance apart from one another and are essentially parallel to one another. The front face 104 extends the distance between the top and bottom faces 100, 102 to fixably connect them. The height of the extension box 74, i.e., the height of the front face 104, which corresponds to the distance between the top and bottom faces 100, 102, is less than the height of the interior 70 of the extension section 12, but essentially equal to the height of the of the base box 56.

The top and bottom faces 100, 102 are essentially identically configured. The top and bottom faces 100, 102 are each segmented into a rear portion 112 and a front portion 114 having different widths. The transition from the rear portion 112 to the front portion 114 defines a flange 116 having a width equal to the difference between the widths of the rear and front portions 112, 114, respectively. The width of the rear portion 112 is essentially equal to the widths of the top, bottom and rear faces 80, 82, 84 of the base section 42, thereby enabling the rear portion 112 of the extension box 74 to enter the interior 52 of the base section 42 through the front end 54. The widths of the front portion 114 and front face 104 are essentially equal to, and preferably somewhat greater than, the width of the interior 52 of the base section 42, but less than the width of the interior 70 of the extension section 12. Accordingly, the front portion 114 and front face 104 of the extension box 74 fit through the rear end 15 and extend into the interior 70 of the extension section 12. However, the front portion 114 and front face 104 of the extension box 74 preferably do not extend any significant distance into the interior 52 of the base section 42 through the front end 54.

The top and bottom faces 100, 102 are further configured with a stationary pin slot 118, a front pivot post aperture 120 and a removable pin aperture 122 formed in each. A cylindrical alignment peg 123 is also mounted upon each of the top and bottom faces 100, 102. The stationary pin slot 118 is centrally aligned with the longitudinal axis of the top and bottom faces 100, 102 and is closed at the front, but open at the rear. The stationary pin slot 118 is slightly wider and longer than the diameter of the stationary pin 61 to enable the stationary pin 61 to occupy the stationary pin slot 118. The front pivot post aperture 120 is positioned to the corresponding side of the stationary pin slot 118 as the rear pivot post aperture 94 of the base box 56 and has a diameter slightly larger than the diameter of a front pivot post 124 (described below with reference to the pivot box 78) to receive the front pivot post 124 therein. The removable pin aperture 122 is centrally aligned with the longitudinal axis of the top and bottom faces 100, 102 and has a slightly larger diameter than the diameter of the removable pin 64 (with the exception of the head of the removable pin 64) to enable the removable pin aperture 122 to slidably receive the removable pin 64 therein. The removable pin aperture 122 is spaced apart and forward of the stationary pin slot 118 by a distance corresponding to the distance between the stationary pin aperture 58 and removable pin aperture 60 of the base section 42. The alignment peg 123 is centrally aligned with the longitudinal axis of the extension box 74 and positioned at or near the intersection of the rear and front portions 112, 114 in correspondence with the flange 116. The alignment peg 123 extends away from the top and bottom faces 100, 102, but only to a height which is less than the distance between the top and bottom faces 100, 102 and the top and bottom walls 68 of the front section 12 and which is also less than the distance between the top and bottom faces 100, 102 and the top and bottom walls 50 of the base section 42. A service opening 126 is provided through the front face 104 of the extension box 74, which permits service lines, such as electrical wiring or hydraulic brake lines, to pass freely from through the length of the extension box 74.

The pivot box 78 has an essentially rectangular configuration with a top crossbar 128, a bottom crossbar 130, a rear support post 132 and a front support post 134. The top and bottom crossbars 128, 130 are essentially identically configured with the top crossbar 128 having a rear end 136 and a front end 138 and the bottom crossbar 130 similarly having a rear end 140 and a front end 142, which are vertically aligned with the rear and front ends 136, 138, respectively, of the top crossbar 128. The top and bottom crossbars 128, 130 are spaced a vertical distance apart from one another and are essentially parallel to one another.

The rear and front support posts 132, 134 are essentially identically configured, with the rear support post 132 having a top end 144 and a bottom end 146 and the front support post 134 similarly having a top end 148 and a bottom end 150. The rear and front support posts 132, 134 are aligned essentially perpendicular to the top and bottom crossbars 128, 130 and extend the distance between the top and bottom crossbars 128, 130. The rear and front support posts 132, 134 are spaced a horizontal distance apart from one another, with the top end 144 of the rear support post 132 fixably attached to the top crossbar 128 adjacent to the rear end 136 and the bottom end 146 of the rear support post 132 correspondingly fixably attached to the bottom crossbar 130 adjacent to the rear end 140. The top end 148 of the front support post 134 is fixably attached to the top crossbar 128, but at a point set back a significant backward distance from the front end 138. The bottom end 150 of the front support post 134 is correspondingly fixably attached to the bottom crossbar 130 at a point set back a significant backward distance from the front end 142 corresponding to the distance between the front end 138 of the top crossbar 128 and the bottom end 150 of the front support post 134.

The height of the pivot box 78 is less than the height of the base box 56 or extension box 74 and the width of the pivot box 78 is essentially less than the width of the top and bottom faces 80, 82 of the base box 56 or the width of the rear portion 112 of the top and bottom faces 100, 102 of the extension box 74. In particular, the width of the pivot box 78 is preferably about equal to the width of a side portion 151 of the top and bottom faces 80, 82 of the base box 56, which includes the rear pivot post aperture 94. The width of the pivot box 78 is also preferably about equal to the width of a side portion 152 of the top and bottom faces 100, 102 of the extension box 74, which includes the front pivot post aperture 120. As such, the pivot box 78 is dimensioned to fit through the open front 86 of the base box 56 and the open rear 106 of extension box 74, with the top crossbar 128 slidably engaging or adjacent to the bottom of the top faces 80, 100 of the base and extension boxes 56, 74, respectively, and the bottom crossbar 130 slidably engaging or adjacent to the top of the bottom faces 82, 102 of the base and extension boxes 56, 74, respectively.

The top and bottom crossbars 128, 130 each have a rear pivot post aperture 153 and a front pivot post aperture 154 formed therein. The rear and front pivot post apertures 153, 154 are serially spaced a horizontal distance apart from one another between the attachment points of the rear and front support posts 132, 134 with the top and bottom crossbars 128, 130, respectively. The rear pivot post aperture 153 has a diameter slightly larger than the diameter of the rear pivot post 96 to receive the rear pivot post 96 therein. The front pivot post aperture 154 has a diameter slightly larger than the diameter of the front pivot post 124 to receive the front pivot post 124 therein. The top and bottom crossbars 128, 130 each have a flange 156 extending laterally from the front ends 138, 142, respectively. The flange 156 has a width equal to the width of the flange 116. The flange 156 prevents the front ends 138, 142 of the top and bottom crossbars 128, 130, respectively, from entering the interior 52 of the base section 42 through the front end 54, while enabling the remainder of the top and bottom crossbars 128, 130 to fit through the front end 54 into the interior 52 of the base section 42.

When the internal hinge 44 is assembled, the rear ends 136, 140 of the top and bottom crossbars 128, 130 are fitted between the top and bottom faces 80, 82 of the base box 56 such that the rear pivot post aperture 94 of the top and bottom faces 80, 82 vertically aligns with the rear pivot post aperture 153 of the top and bottom crossbars 128, 130. The front ends 138, 142 of the, top and bottom crossbars 128, 130 are similarly fitted between the top and bottom faces 100, 102 of the extension box 74 such that the front pivot post aperture 120 of the top and bottom faces 100, 102 vertically aligns with the front pivot post aperture 154 of the top and bottom crossbars 128, 130. The rear and front pivot posts 96, 124 are cylindrically configured rods having a height substantially greater than or essentially equal to the height of the base box 56 or extension box 74.

The rear pivot post 96 is slid through the rear pivot post aperture 94 of the top and bottom faces 80, 82 and the rear pivot post aperture 153 of the top and bottom crossbars 128, 130 to occupy the rear pivot post apertures 94, 153. The rear pivot post 96 is permanently rotatably connected to the top and bottom faces 80, 82 of the base box 56 by conventional means, with the heads of the rear pivot post 96 preferably essentially flush with the top and bottom faces 80, 82. The front pivot post 124 is similarly slid through the front pivot post aperture 120 of the top and bottom faces 100, 102 of the extension box 74 and the front pivot post aperture 154 of the top and bottom crossbars 128, 130 to occupy the front pivot post apertures 120, 154. The front pivot post 124 is permanently rotatably connected to the top and bottom faces 100, 102 of the extension box 74 by conventional means, with the heads of the front pivot post 124 preferably essentially flush with the top and bottom faces 100, 102. This configuration enables the base box 56 and pivot box 78 to rotate relative to one another about the rear pivot post 96 and the extension box 74 and pivot box 78 to rotate relative to one another about the front pivot post 124.

A top load transfer plate 160 and a bottom load transfer plate 162 are also shown in FIG. 4B, in association with the internal hinge 44. The top and bottom load transfer plates 160, 162 are essentially identically configured, being formed from the same or similar material as the components of the internal hinge 44. The top and bottom load transfer plates 160, 162 each have an essentially rectangular planar configuration with a rear end 164 and a front end 166. The thickness of the top and bottom load transfer plates 160, 162 are such that the top load transfer plate 160 fits into the interior 52 of the base section 42 between the top face 80 of the base box 56 and the top wall 50 of the base section 42 while the bottom load transfer plate 162 fits into the interior 52 of the base section 42 between the bottom face 82 of the base box 56 and the bottom wall 50 of the base section 42.

An alignment notch 168 is formed in the front end 166 of the top and bottom load transfer plates 160, 162. The alignment notch 168 is centrally aligned with the longitudinal axis of the top and bottom load transfer plates 160, 162 plates. The alignment notch 168 has a V-shaped open front and a U-shaped closed rear. The alignment notch 168 is dimensioned to receive the alignment peg 123 mounted on the top and bottom faces 100, 102 of the extension box 74 within the U-shaped closed rear when the trailer tongue assembly 10 is in the extended operational position. As will be apparent, the alignment peg 123 and alignment notch 168 cooperatively insure correct alignment of the top and bottom load transfer plates 160, 162 with the base box 56 when the trailer tongue assembly 10 is transitioned from the folded storage position to the extended operational position in a manner described hereafter. The width of the top and bottom load transfer plates 160, 162 is essentially equal to or substantially less than the widths of the top, bottom and rear faces 80, 82, 84. Accordingly, the rear end 164 of the top and bottom load transfer plates 160, 162 is able to fit into the interior 52 of the base section 42 through the front end 54, while the front end 166 is able to fit into the interior 70 of the front section 12 through the front end 15.

The top and bottom load transfer plates 160, 162 also have a stationary pin aperture 170 and a removable pin aperture 172 formed in each. The stationary and removable pin apertures 170, 172 are centrally aligned with the longitudinal axis of the top and bottom load transfer plates 160, 162 plates and are horizontally spaced apart from one another by a distance corresponding to the distance between the stationary pin aperture 58 and removable pin aperture 60 of the base section 42. As such, the stationary and removable pin apertures 170, 172 are positioned in the interior 52 of the base section 42 in vertical alignment with the stationary and removable pin apertures 58, 60, respectively. The stationary pin aperture 170 has a diameter slightly larger than the diameter of the stationary pin 61 to receive the stationary pin 61 therein. The removable pin aperture 172 similarly has a diameter slightly larger than the diameter of the removable pin 64 to receive the removable pin 64 therein. The top and bottom load transfer plates 160, 162 remain fixably mounted at all times in the base section 42 proximal to the front end 54 by means of the stationary pin 61.

Figure 5:
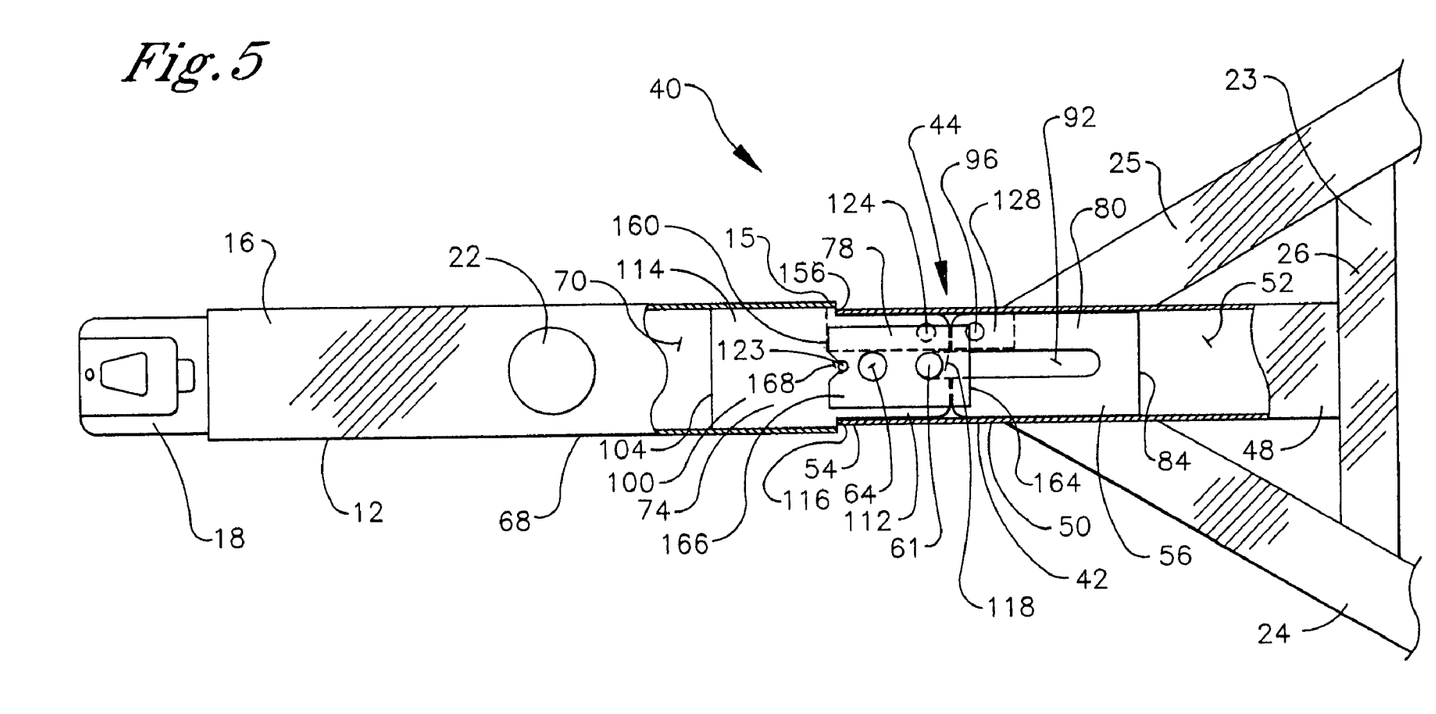
FIG. 5 is a top plan view of the tongue assembly of FIG. 2 in partial cut-away, wherein the tongue assembly is configured in the extended operational position.
Figure 6:
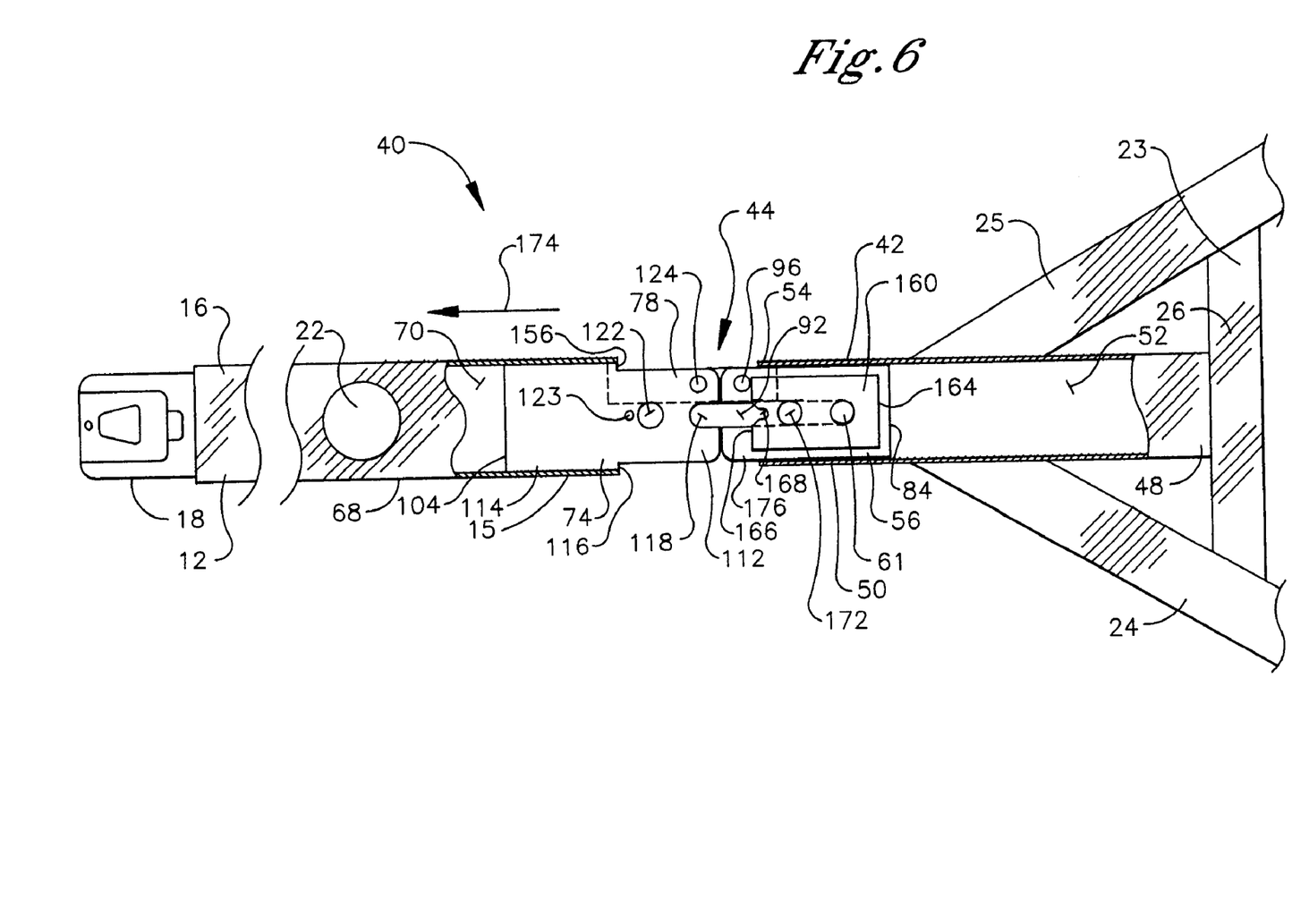
FIG. 6 is a top plan view of the tongue assembly of FIG. 2 in partial cut-away, wherein the tongue assembly is configured in an intermediate position while transitioning between the extended operational position and the folded storage position.
Figure 7:
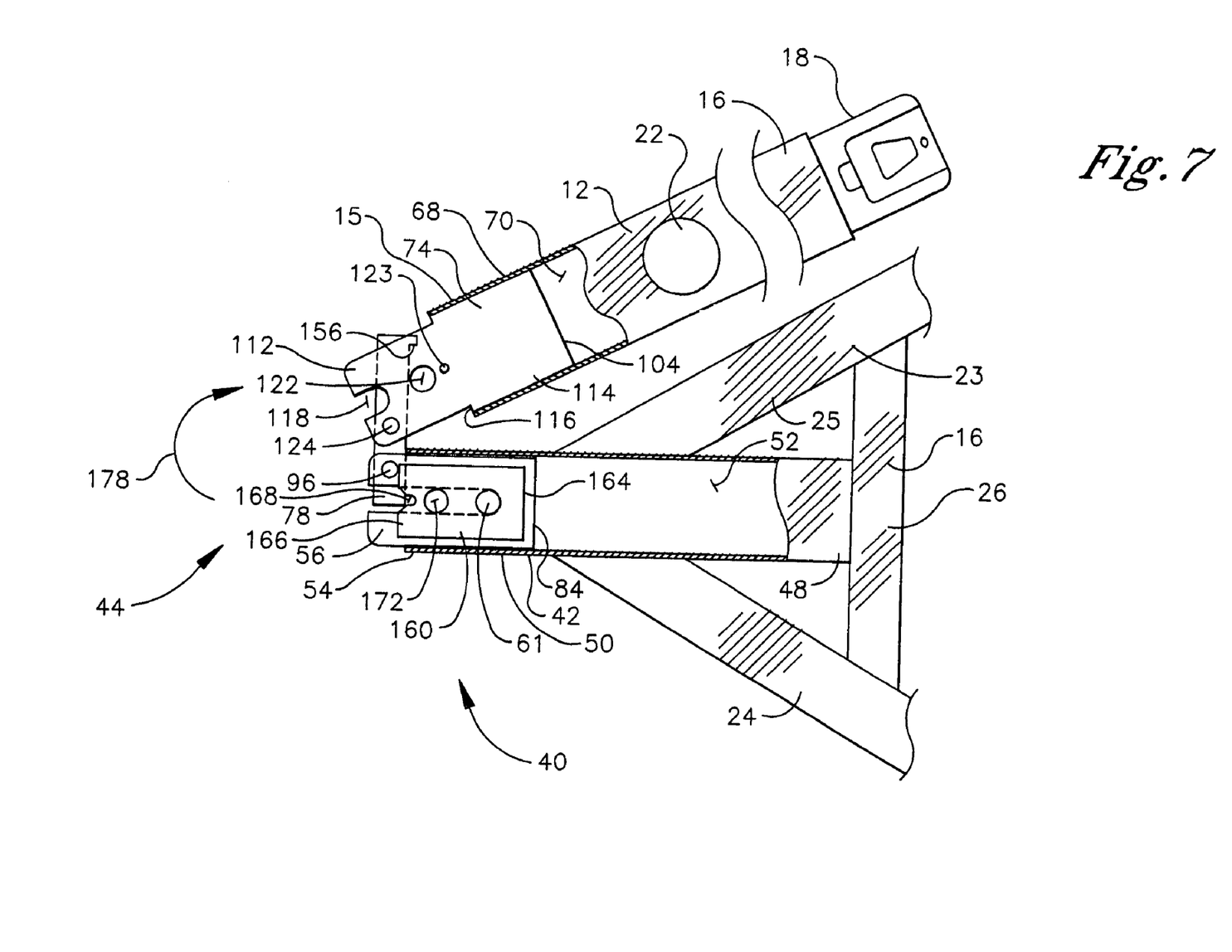
FIG. 7 is a top plan view of the tongue assembly of FIG. 2 in partial cut-away, wherein the tongue assembly is configured in the folded storage position after transitioning from the extended operational position, to the intermediate position, and finally to the folded storage position.

Configuration of the above-described tongue assembly 40 in different positions is described as follows with reference to FIGS. 5–7. Components of the tongue assembly 40 shown in FIGS. 1–4B, which are common to FIGS. 5–7, are designated by the same reference characters. The top walls 50, 68 of the base and extension sections 42, 12, respectively, are cut away in FIGS. 5–7 for clarity.

Referring initially to FIG. 5, the extended operational position of the tongue assembly 40 is shown, which enables a user to selectively engage a tow vehicle with a trailer associated with the tongue assembly 40 for the purpose of towing the trailer and its contents to a desired location. The extended operational position is characterized by the orientation of the base section 42, extension section 12, and internal hinge 44 relative to one another. In general, the base section 42, extension section 12, and internal hinge 44 are in contiguous linear alignment with one another when the tongue assembly 40 is in the extended operational position. As such, the internal hinge 44 is shielded from view in the extended operational position, the entirety of the internal hinge 44 being essentially completely housed by the base and extension sections 42, 12.

The extended operational position is further characterized by the specific orientation of the components of the internal hinge 44 relative to one another and relative to the base and extension sections 42, 12. In particular, the base box 56 is housed in its entirety within the interior 52 of the base section 42, with the sides of the top, bottom and rear faces 80, 82, 84 of the base box 56 slidably engaging the side walls 50 of the base section 42. The rear portion 112 of the top and bottom faces 100, 102 of the extension box 74 likewise extends into the interior 52 of the base section 42 forward of the base box 56. The rear portion 112 extends into the interior 52 via the front end 54 of the base section 42 and the sides of the rear portion 112 slidably engage the side walls 50 of the base section 42. The rear of the top and bottom faces 100, 102 of the extension box 74 contiguously engage the front of the top and bottom faces 80, 82 of the base box 56, respectively, within the interior 52 of the base section 42.

The front portion 114 of the top and bottom faces 100, 102 of the extension box 74 extends into the interior 70 of the extension section 12 via the rear end 15 of the extension section 12 and the sides of the front portion 114 slidably engage the side walls 68 of the extension section 12. The terminus of the walls 68 at the rear end 15 of the extension section 12 circumscribes the terminus of the walls 50 at the front end 54 of the base section 42 and the flange 116 of the top and bottom faces 100, 102 engages the terminus of the side walls 50 at the front end 54 of the base section 42.

The top and bottom crossbars 128, 130 are vertically aligned with and slidably engage the side portion 151 of the top and bottom faces 80, 82 of the base box 56 and are further vertically aligned with and slidably engage the side portion 152 of the top and bottom faces 100, 102 of the extension box 74. The front ends 138, 142 of the top and bottom crossbars 128, 130, respectively, extend into the interior 70 of the extension section 12 via the rear end 15 and the remainder of the top and bottom crossbars 128, 130 extend into the interior 52 of the base section 42 via the front end 54. The flange 156 of the top and bottom crossbars 128, 130 engages the terminus of the side walls 50 at the front end 54 of the base section 42 immediately above the flange 116 of the top and bottom faces 100, 102. The flange 156 also engages the side walls 68 at the rear end 15 of the extension section 12 to maintain alignment between the base and extension sections 42, 12 when in the extended operational position.

As noted above, the rear pivot post 96 occupies the rear pivot post aperture 94 of the top and bottom faces 80, 82 and the rear pivot post aperture 153 of the top and bottom crossbars 128, 130 and is permanently rotatably connected to the top and bottom faces 80, 82 of the base box 56. The front pivot post 124 similarly occupies the front pivot post aperture 120 of the top and bottom faces 100, 102 of the extension box 74 and the front pivot post aperture 154 of the top and bottom crossbars 128, 130 and is permanently rotatably connected to the top and bottom faces 100, 102 of the extension box 74. The rear pivot post 96 and the front pivot post 124 are in linear alignment with the side portion 151 of the top and bottom faces 80, 82 of the base box 56 and the side portion 152 of the top and bottom faces 100, 102 of the extension box 74.

The front end 166 of the top and bottom load transfer plates 160, 162 extends into the interior 70 of the extension section 12 via the rear end 15 and slidably engages the top wall 68 of the extension section 12. The rear end 164 of the top and bottom load transfer plates 160, 162 extends into the interior 52 of the base section 42 via the front end 54 to slidably engage the top face 80 of the base box 56 and fixably engage the top wall 50 of the base section 42. The alignment peg 123 of the top and bottom faces 100, 102 resides in the alignment notch 168 of the top and bottom load transfer plates 160, 162. The primary function of the top and bottom load transfer plates 160, 162 is to reduce vertical and horizontal loads on the internal hinge 44 during towing. In particular, the top and bottom load transfer plates 160, 162 reduce vertical loads on the top and bottom faces 80, 82, 100, 102 of the base and extension boxes 56, 74, respectively, and more specifically reduce vertical loads on the junction of the base and extension boxes 56, 74. The configuration and positioning of the top and bottom load transfer plates 160, 162 effectively transfers vertical loads from the internal hinge 44 to the top and bottom load transfer plates 160, 162 themselves during towing. The top and bottom load transfer plates 160, 162 also reduce horizontal loads on the removable pin 64 by effectively transferring horizontal towing and braking loads from the removable pin 64 to the stationary pin 61, which is more suited to handle such loads.

The stationary pin aperture 58 of the base section 42, the stationary pin slot 118 of the extension box 74 and the stationary pin aperture 170 of the top and bottom load transfer plates 160, 162 are all vertically aligned with one another. The stationary pin 61 is fixably mounted in the stationary pin aperture 58 of the base section 42 and stationary pin aperture 170 of the top and bottom load transfer plates 160, 162, while selectively occupying the stationary pin slot 118 of the extension box 74. The stationary pin 61 fixably connects the base section 42 and the top and bottom load transfer plates 160, 162 and is selectively displacable from the stationary pin slot 118 of the extension box 74 by slidable displacement of the extension box 74 described below.

The removable pin aperture 60 of the base section 42, the removable pin aperture 122 of the extension box 74 and the removable pin aperture 172 of the top and bottom load transfer plates 160, 162 are all vertically aligned with one another and the removable pin 64 is selectively positioned in the vertically aligned removable pin apertures 60, 122, 172. When the removable pin 64 occupies the removable pin apertures 60, 122, 172, rotational displacement of the internal hinge 44 is effectively blocked and the tongue assembly 40 remains locked in the extended operational position.

Referring to FIG. 6, the tongue assembly 40 is shown in the intermediate position, wherein the tongue assembly 40 is in the process of transitioning between the extended operational position and the folded storage position. The intermediate position evolves from the extended operational position by initially removably displacing the removable pin 64 from the removable pin apertures 60, 122, 172, preferably by manually sliding the removable pin 64 upward out of the removable pin apertures 60, 122, 172 in the direction of the pin removal arrow 66 shown in FIG. 2. Removable displacement of the removable pin 64 from the removable pin apertures 60, 122, 172 enables slidable linear displacement of the internal hinge 44 relative to the base section 42. Slidable linear displacement of the internal hinge 44 is preferably effected by manually gripping the extension section 12 and manually pulling the extension section 12 forward in the direction of a linear displacement arrow 174. The internal hinge 44 is correspondingly slidably displaced because the internal hinge 44 is connected to the extension section 12 by attachment of the extension box 74 to the extension section 12. When the extension section 12, and correspondingly the internal hinge 44, are forwardly slidably displaced, the base section 42, extension section 12, and internal hinge 44 remain in linear alignment with one another, but are no longer contiguous. Thus, a substantial portion of the internal hinge 44 is no longer shielded from view, but is exposed because the extension section 12 is forwardly slidably displaced a linear separation distance from the base section 42.

Slidable displacement of the internal hinge 44, slides the base box 56 forward along the side walls 50 of the base section 42 to expose a front portion 176 of the base box 56 out of the front end 54 of the base section 42. The rear portion 112 of the top and bottom faces 100, 102 of the extension box 74 likewise slides forward along the side walls 50 of the base section 42 to expose the rear portion 112 out the front end 54 of the base section 42. The rear of the top and bottom faces 100, 102 of the extension box 74 remain contiguously engaged with the front of the top and bottom faces 80, 82 of the base box 56, but are exposed, no longer being within the interior 52 of the base section 42. The front portion 114 of the top and bottom faces 100, 102 of the extension box 74, which is fixably attached to the extension section 12, remains in the interior 70 of the extension section 12 with the sides of the front portion 114 slidably engaging the side walls 68 of the extension section 12. However, the terminus of the walls 68 at the rear end 15 of the extension section 12 are separated from the terminus of the walls 50 at the front end 54 of the base section 42 by a distance corresponding to the linear separation distance. The flange 116 of the top and bottom faces 100, 102 is also separated from the terminus of the side walls 50 by a distance corresponding to the linear separation distance. The linear separation distance is typically on the order of about 2 to 8 inches.

The top and bottom crossbars 128, 130 remain vertically aligned with and slidably engage the side portion 151 of the top and bottom faces 80, 82 of the base box 56 and remain vertically aligned with and slidably engage the side portion 152 of the top and bottom faces 100, 102 of the extension box 74. The front ends 138, 142 of the top and bottom crossbars 128, 130, respectively, remain extended into the interior 70 of the extension section 12 via the rear end 15. However, only the rear ends 136, 140 of the top and bottom crossbars 128, 130 extend into the interior 52 of the base section 42 via the front end 54, with the remainder of the top and bottom crossbars 128, 130 being exposed. The flange 156 of the top and bottom crossbars 128, 130 is separated by a distance corresponding to the linear separation distance from the terminus of the side walls 50. The rear pivot post 96 and the front pivot post 124 remain in linear alignment with the side portion 151 of the top and bottom faces 80, 82 of the base box 56 and the side portion 152 of the top and bottom faces 100, 102 of the extension box 74.

The front end 166 of the top and bottom load transfer plates 160, 162 is exposed, no longer extending into the interior 70 of the extension section. 12 via the rear end 15, and the alignment peg 123 is withdrawn from the alignment notch 168 in the front end 166 of the top and bottom load transfer plates 160, 162. However, the position of the top and bottom load transfer plates 160, 162 remains fixed relative to the base section 42 with the rear end 164 of the top and bottom load transfer plates 160, 162 extending into the interior 52 of the base section 42 via the front end 54 to fixably engage the top wall 50 of the base section 42.

The stationary pin aperture 58 of the base section 42 and stationary pin aperture 170 of the top and bottom load transfer plates 160, 162 remain vertically aligned with one another because the stationary pin 61 is fixably mounted in the stationary pin aperture 58 of the base section 42 and stationary pin aperture 170 of the top and bottom load transfer plates 160, 162. However, the stationary pin slot 118 of the extension box 74 is linearly displaced out of vertical alignment with the stationary pin aperture 58 of the base section 42 and stationary pin aperture 170 of the top and bottom load transfer plates 160, 162. In particular, the stationary pin slot 118 of the extension box 74 is forwardly displaced relative to the stationary pin 61, thereby removing the stationary pin 61 from the stationary pin slot 118. The stationary pin travel slot 92 of the base box 56 is likewise forwardly displaced its entire length relative to the stationary pin 61, which causes the stationary pin 61 to selectively engage the closed rear of the stationary pin travel slot 92. As such, the stationary pin 61 acts as a stop to prevent further forward displacement of the base box 56 relative to the base section 42 and maintain the base box 56 slidably mounted in the base section 42.

The removable pin aperture 60 of the base section 42 and the removable pin aperture 172 of the top and bottom load transfer plates 160, 162 remain vertically aligned with one another. However, the removable pin aperture 122 of the extension box 74 is linearly displaced out of vertical alignment with the removable pin apertures 60, 122 once the removable pin 64 is removably displaced from the removable pin apertures 60, 122, 172 as described above.

Referring to FIG. 7, the tongue assembly 40 is shown in the folded storage position after having been transitioned from the extended operational position, to the intermediate position, and finally to the folded storage position. The folded storage position evolves from the intermediate position by rotationally displacing the internal hinge 44 about two axes of rotation, i.e., the rear pivot post 96 and the front pivot post 124. Rotational displacement is in the clockwise direction of a rotational displacement arrow 178. Rotational displacement is generally effected by rotationally displacing the pivot box 78 about the rear pivot post 96 relative to the base box 56 in the direction of the rotational displacement arrow 178 and by rotationally displacing the extension box 74 about the front pivot post 124 relative to the pivot box 78 likewise in the direction of the rotational displacement arrow 178.

More particularly, rotational displacement of the internal hinge 44 is preferably performed by maintaining the removable pin 64 out of the removable pin apertures 60, 122, 172 and manually gripping the extension section 12. The extension section 12 is manually pulled toward the user and backward in the direction of the rotational displacement arrow 178, while maintaining the positions of the base section 42, base box 56, and stationary pin 61 fixed relative to one another, as described above with respect the intermediate position. Rotationally displacing the extension section 12, correspondingly rotationally displaces the internal hinge 44 in the direction of the rotational displacement arrow 178.

Specifically, the top and bottom crossbars 128, 130 are rotated about the rear pivot post 96 relative to the top and bottom faces 80, 82 of the base box 56 causing the rear of the top and bottom faces 100, 102 of the extension box 74 to disengage from the front of the top and bottom faces 80, 82 of the base box 56, while the front portion 114 of the top and bottom faces 100, 102 of the extension box 74 remains fixed in the interior 70 of the extension section 12. The top and bottom faces 100, 102 of the extension box 74 are simultaneously or sequentially rotated about the front pivot post 124 relative to the top and bottom crossbars 128, 130, causing the flange 156 of the top and bottom crossbars 128, 130 to disengage from the side walls 68 at the rear end 15 of the extension section 12. Rotation is continued until predetermined criteria are met, for example, further rotation is blocked by engagement of the extension section 12 or coupler 18 with the front section of the trailer 23, further rotation is blocked by engagement of the extension section 12 or coupler 18 with the base section 42, the rear and front pivot posts 96, 124 are in angular alignment with the top and bottom faces 100, 102 of the extension box 74, the longitudinal axis of the extension section 12 forms an angle with the longitudinal axis of the base section 42 which is less than about 90°, the longitudinal axis of the extension section 12 is in parallel alignment with the longitudinal axis of the first diagonal support 18 of the front section of the trailer 23, or the like.

In any case, when the tongue assembly 40 is in the folded storage position, the base section 42, extension section 12, and internal hinge 44 are no longer in linear alignment with one another as in the extended operational position. The extension section 12, extension box 74 and pivot box 78 are repositioned relative to one another in the storage position, with the extension section 12 preferably rotationally displaced toward a position of overlapping alignment with the first diagonal support 18 of the front section of the trailer 23. The storage position substantially shortens the length of the tongue assembly 40 from the operational position and correspondingly shortens the overall length of the associated trailer for improved storage ability of the trailerwhen the trailer is disengaged from a tow vehicle and stored at a desired location.

The stationary pin 61 is described above as being fixably retained at all times within the stationary pin apertures 58, 170 when the tongue assembly 40 is in the extended operational position, folded storage position, or is transitioning therebetween. However, it is within the scope of the present invention to provide for removal of the stationary pin 61 from the stationary pin apertures 58, 170 when it is desired to service, replace, remove or otherwise access the internal hinge 44 in its entirety or individual components thereof. Removal of the stationary pin 61 from the stationary pin apertures 58, 170 is effected by expanding the retention rings 62 and withdrawing the expanded retention rings 62 from the retention grooves 63 in the stationary-pin 61. The stationary pin 61 is then removably displaced from the stationary pin apertures 58, 170, preferably by manually sliding the stationary pin 61 upward out of the stationary pin apertures 58, 170 in the direction of the pin removal arrow 66 shown in FIG. 2.

While the forgoing preferred embodiments of the invention have been described and shown, it is understood that alternatives and modifications, such as those suggested and others, may be made thereto and fall within the scope of the invention.

I claim:

1. A trailer tongue assembly comprising:
    a base section engagable with a trailer;
    an extension section for supporting a coupler; and
    an internal hinge positioned between said extension section and said base section, said internal hinge rotationally connecting said base section and said extension section and having a first pivot post and a second pivot post defining two axes of rotation, said base section and said internal hinge rotationally displacable relative to each other about said first pivot post, and said extension section and said internal hinge rotationally displacable relative to each other about said second pivot post, wherein said trailer tongue assembly has an extended operational position and a folded storage position with said internal hinge housed in said trailer tongue assembly and essentially shielded from view by said trailer tongue assembly when said trailer tongue assembly is in said extended operational position.

2. The trailer tongue assembly of claim 1, wherein said trailer tongue assembly has a greater length in said extended operational position than in said folded storage position.

3. The trailer tongue assembly of claim 1, wherein said internal hinge has a base box mounted in said base section, an extension box mounted in said extension section and a pivot box positioned between said base box and said extension box and rotationally connected to said base box and said extension box.

4. The trailer tongue assembly of claim 1, wherein said internal hinge has a base box mounted in said base section, an extension box mounted in said extension section, and a pivot box positioned between said base box and said extension box, said first pivot post rotationally connecting said pivot box and said base box and said second pivot post rotationally connecting said pivot box and said extension box.

5. The trailer tongue assembly of claim 1, wherein said extension section has a greater length than said base section.

6. A trailer tongue assembly comprising:
   a base section;
   an extension section having a longitudinal axis; and
   an internal hinge positioned between said extension section and said base section, said internal hinge rotationally connecting said base section and said extension section, wherein said internal hinge has a base box mounted in said base section and an extension box mounted in said extension section, further wherein said base box and said extension box are horizontally positioned in series to define a junction between said base box and said extension box, and wherein said base box and said extension box are slidably displaceable relative to said extension section along an essentially linear displacement axis essentially collinear with siad longitudinal axis of said extension section.

7. The trailer tongue assembly of claim 6 further comprising a plate mounted in said base section, extending over or under said junction, and slidably engaging said base box and said extension box when said trailer tongue assembly is in said extended operational position.

8. A trailer tongue assembly comprising:
   a base section;
   an extension section having a longitudinal axis; and
   an internal hinge positioned between said extension section and said base section, said internal hinge rotationally connecting said base section and said extension section, wherein said internal hinge has a base box mounted in said base section and an extension box mounted in said extension section, and wherein said base box and said extension box are slidably displaceable relative to said extension section along an essentially linear displacement axis essentially collinear with said longitudinal axis of said extension section.

9. The trailer tongue assembly of claim 8 further comprising a stationary pin mounted through said base section, wherein said stationary pin selectively engages said base box when said trailer tongue assembly is in said folded storage position and said stationary pin selectively engages said extension box when said trailer tongue assembly is in said extended operational position.

10. A trailer tongue assembly comprising:
    a base section;
    an extension section; and
    an internal hinge including a base box mounted in said base section, an extension box mounted in said extension section and a pivot box positioned between said base box and said extension box and rotationally connected to said base box and said extension box, wherein said base box has a U-shaped configuration with a top face, a bottom face, a rear face and an open front end, said extension box has a U-shaped configuration with a top face, a bottom face, a front face and an open rear end, and said open front end of said box faces said open rear end of said extension box, and wherein said trailer tongue assembly has an extended operational position and a folded storage position, said trailer tongue assembly having a greater length in said extended operational position than in said folded storage position.

11. The trailer tongue assembly of claim 10, wherein said pivot box has a top crossbar and a bottom crossbar positioned below said top crossbar, further wherein said top and bottom crossbars are positioned between said top and bottom faces of said base box and said top and bottom crossbars are positioned between said top and bottom faces of said extension box.

12. The trailer tongue assembly of claim 11, wherein said internal hinge further includes a first pivot post and a second pivot post, said first pivot post extending between said top and bottom faces of said base box through said top and bottom crossbars and rotationally connecting said top and bottom faces of said base box, said second pivot post extending between said top and bottom faces of said extension box through said top and bottom crossbars and rotationally connecting said top and bottom faces of said extension box.

13. The trailer tongue assembly of claim 12, wherein said first pivot post and said second pivot post define two axes of rotation, said base box and said pivot box rotationally displacable relative to each other about said first pivot post, and said extension box and said pivot box rotationally displacable relative to each other about said second pivot post.

14. A trailer tongue assembly comprising:
    a base section;
    an extension section; and
    an internal hinge rotationally connecting said base section and said extension section, wherein said internal hinge has a first pivot post and a second pivot post defining two axes of rotation, said base section and said internal hinge rotationally displacable relative to each other about said first pivot post and said extension section and said internal hinge rotationally displacable relative to each other about said second pivot post.

15. The trailer tongue assembly of claim 14, wherein said base section is engagable with a trailer.

16. The trailer tongue assembly of claim 14, wherein said extension section supports a coupler.

17. The trailer tongue assembly of claim 14, wherein said trailer tongue assembly has an extended operational position and a folded storage position with said internal hinge housed in said trailer tongue assembly and essentially shielded from view by said trailer tongue assembly when said trailer tongue assembly is in said extended operational position.

18. A trailer tongue assembly comprising:
    a base section;
    an extension section; and
    an internal hinge having an axis of rotation about which said base section and said extension section are rotationally displacable relative to each other, wherein said trailer tongue assembly has an extended operational position and a folded storage position, said axis of rotation slidably displaceable internally within said trailer tongue assembly when said trailer tongue assembly is in said extended operational position and said axis of rotation slidably displaceable external to said trailer tongue assembly when said trailer tongue assembly is in said folded storage position.

* * * * *